United States Patent [11] 3,607,602

[72] Inventor Eduard Greskiewicz
 West Wyoming, Pa.
[21] Appl. No. 658,324
[22] Filed Aug. 4, 1967
[45] Patented Sept. 21, 1971
[73] Assignee Chemie-Industrie-Investment AG
[32] Priority Aug. 9, 1966
[33] Switzerland
[31] 11,704/66

[54] METHOD OF AND A LAMINATED MATERIAL FOR PACKAGING ARTICLES
 9 Claims, No Drawings
[52] U.S. Cl. ...................................................... 161/160,
 156/85, 156/285, 206/46
[51] Int. Cl. ...................................................... B32b 3/26,
 B32b 7/12
[50] Field of Search ........................................... 161/102,
 104, 160, 162, 166, 402, 410; 99/171 LP; 220/9 F;
 206/46 FCM, 65 S; 229/3.5; 156/85, 86, 285

[56] References Cited
 UNITED STATES PATENTS
2,838,421 6/1958 Sohl ............................ 161/406
3,416,991 12/1968 Yoshimura .................. 161/104
3,437,197 4/1969 Wirfel ......................... 161/160

Primary Examiner—William J. Van Balen
Attorney—Lowry, Rinehart, Markva & Smith

ABSTRACT: A method of packaging articles is provided whereby a laminated packaging material is assembled and wrapped around at least one article. The laminated packaging material comprises a heat-shrinkable thermoplastic resin film, a plastic foam layer, and an adhesive bonding material to attach the thermoplastic film to the foam layer. The wrapped article may be subjected to heat to shrink the thermoplastic resin.

METHOD OF AND A LAMINATED MATERIAL FOR PACKAGING ARTICLES

BACKGROUND OF THE INVENTION

Plastic films shrinking under the influence of elevated temperatures, are known, Such films find use primarily in the art of packaging; for example films of polyvinyl acetal are manufactured to shrinking capsules and strippable packings which even in the case of irregularly shaped goods make possible a covering or wrapping that is creaseless to a far-reaching extent. Such shrinkable films often are used also for simultaneously wrapping several articles in a single bundle.

In many cases it is desirable to attain also a better thermal isolation or a better mechanical protection of the goods to be packed, besides the packing effect of the film. Such protective effects may be attained by a plurality of known packing materials such as particularly formed paper, corrugated paper fibrous materials and, above all, flexible foamed rubber or plastic foam, in particular plastic foams made with the aid of driving means and having closed or open pores and on the basis of urea and phenol resins, polyurethane, epoxy resins, polystyrene and polyvinyl chloride (with softener). In the thin layers conventional for most packing purposes, however, such plastic foams have insufficient mechanical strength; often it also is desirable that the outside skin of the wrapper be strong and smooth, which with most plastic foams only is possible to an insufficient extent.

In many cases, therefore, shrinkable films have been used together with plastic materials so that the goods to be packed first were wrapped by the plastic foam and on top thereof the shrinkable film was used, as is done otherwise without the use of the plastic foam. Such packing has various disadvantages which oppose a wider use of this packing method. For example, it often is not possible to avoid in such packing the occurrence of folds and wrinkles, undesirable hollow spaces and other irregularities. Neither can such packings be made on semiautomatic or fully automatic machines

PURPOSE OF THE INVENTION

The primary object of this invention is to provide a laminated packaging material comprising a heat-shrinkable thermoplastic resin film, a plastic foam layer, and an adhesive bonding material located therebetween.

Another object of this invention is to provide a method of packaging articles whereby a laminated packaging material is assembled and wrapped around at least one article.

Another object of this invention is to provide a method of packaging articles whereby the wrapped article is subjected to heat to shrink the thermoplastic resin.

A still further object of this invention is to overcome the problem of the formation of irregularly wrapped packages when using a combination of a foam material and a heat-shrinkable film.

SUMMARY OF THE INVENTION

A laminated packaging material made in accordance with this invention comprises a heat-shrinkable thermoplastic resin film and a plastic foam layer. An adhesive bonding material is used to attached the thermoplastic film to the foam layer.

The method of packaging articles comprises the steps of providing a laminated packaging material made in accordance with this invention and wrapping same around at least one article.

DESCRIPTION OF SPECIFIC EMBODIMENT

The homogenous bonding of the heat-shrinkable thermoplastic resin such as a polyolefin or polyvinyl chloride film up to about 0.025-inch thickness, to a soft plastic foam, for example on a polyurethane basis, may be accomplished by means of a conventional rubber adhesive (predominantly nonhardening, cold-setting dope). To bond a heat shrinkable thermoplastic resin film of polyvinyl acetal to a plastic foam layer there is used advantageously, however, a polyvinyl-acetal adhesive. In place of an adhesive there also could be used a double-sided tape. It is irrelevant, after all, which of the known methods is used for bonding the heat-shrinkable thermoplastic resin film to the plastic foam layer.

Neither is it essential which methods are used for bonding the laminated material to itself or to other articles.

In a more specific embodiment, the shrinkable film may be electrostatically coated by flakes either before or after the homogenous bonding to the plastic foam layer, so that the completed laminated material comprises on its underside a soft foam layer, while its upper side is velvetlike. Such a laminated material may be used, using the property of shrinking, for decoratively covering arched articles such as cushion cores, the plastic foam layer at the same time assuring a corresponding resilience.

The laminated plastic material of this invention is used for packaging. Either one article or a plurality of articles assembled in one single bundle may be wrapped with the laminated material. This wrapping may be accomplished because most plastic foams have sufficient compressibility to readily yield to the shrinkage energy of conventional shrinkable films, provided the choice of the formulation, pore size and the like is appropriate.

While the laminate of plastic materials, process for their manufacture and use of this laminate have been shown and described in detail, it is obvious that this invention is not to be considered as being limited to the exact form disclosed, and that changes in detail and construction may be made therein within the scope of the invention, without departing from the spirit thereof.

Having thus described my invention, I claim as new and desire to secure by Letters Patent:

1. A laminated packaging material for wrapping articles comprising:
   a) a heat-shrinkable thermoplastic resin film,
   b) a plastic resin foam layer and
   c) bonding means located between the film and layer to attach said film to said foam layer.

2. A laminated packaging material as defined in claim 1 wherein
   said bonding means comprises a double-sided self-sticking tape.

3. A laminated material as defined in claim 1 wherein said bonding means comprises an adhesive material.

4. A laminated material as defined in claim 1 wherein the composition of the plastic foam layer comprises polyurethane.

5. A laminated material as defined in claim 4 wherein the composition of the heat-shrinkable thermoplastic resin film comprises a polyolefin.

6. A laminated material as defined in claim 4 wherein the composition of the heat-shrinkable thermoplastic resin film comprises a polyvinyl chloride.

7. A method of packaging articles comprising:
   a. providing a first material comprising a heat-shrinkable thermoplastic resin,
   b. providing a second material comprising resinous plastic foam,
   c. applying a bonding adhesive to the face of at least one of the materials,
   d. placing the face of the material having the bonding adhesive against the face of the other material to form a bonded laminated structure, and
   e. wrapping at least one article with the laminated packaging material.

8. A method as defined in claim 7 wherein the bonding adhesive comprises a double-sided self-sticking tape.

9. A method as defined in claim 7 wherein the wrapped articles are subjected to heat to shrink the thermoplastic resin.